United States Patent
Fitzgerald et al.

(10) Patent No.: US 6,733,227 B2
(45) Date of Patent: May 11, 2004

(54) ELEVATING LIFT

(75) Inventors: Jeffrey S. Fitzgerald, St. Louis, MO (US); Edward V. Carter, Edwardsville, IL (US)

(73) Assignee: Engineered Support Systems, Inc., St. Louis, MO (US)

( * ) Notice: Subject to any disclaimer, the term of this patent is extended or adjusted under 35 U.S.C. 154(b) by 0 days.

(21) Appl. No.: 10/081,937

(22) Filed: Feb. 21, 2002

(65) Prior Publication Data

US 2003/0156932 A1 Aug. 21, 2003

(51) Int. Cl.[7] .................................................. B60P 1/04
(52) U.S. Cl. ........................ 414/486; 414/471; 414/495; 414/549; 182/2.7; 182/2.8; 182/2.9
(58) Field of Search ............................ 182/2.7, 2.8, 2.9; 414/486, 495, 471, 549

(56) References Cited

U.S. PATENT DOCUMENTS

| | | | | |
|---|---|---|---|---|
| 3,168,284 A | * | 2/1965 | Fisher | 182/2.8 |
| 3,757,635 A | | 9/1973 | Hickerson et al. | |
| 4,019,604 A | | 4/1977 | Benson | |
| 4,026,519 A | * | 5/1977 | Piercy | 254/2 R |
| 4,079,988 A | | 3/1978 | Randall | |
| 4,124,191 A | | 11/1978 | Hofmann | |
| 4,348,008 A | | 9/1982 | Kishi | |
| 4,512,436 A | * | 4/1985 | Freudenthal et al. | 182/2.8 |
| 4,574,685 A | | 3/1986 | Sanborn et al. | |
| 4,690,606 A | | 9/1987 | Ross | |
| 4,778,327 A | * | 10/1988 | Tufenkian et al. | 414/541 |
| 4,784,278 A | * | 11/1988 | Luscombe | 212/229 |
| 4,899,987 A | | 2/1990 | Craig | |
| 4,941,797 A | | 7/1990 | Smillie, III | |
| 4,948,024 A | | 8/1990 | Warner et al. | |
| 5,037,068 A | * | 8/1991 | Grottesi | 254/8 B |
| 5,129,308 A | | 7/1992 | Fuereder et al. | |
| 5,414,949 A | | 5/1995 | Peebles | |
| 5,425,433 A | | 6/1995 | Huber | |
| 5,465,808 A | | 11/1995 | Musgrove | |
| 5,507,496 A | | 4/1996 | Yeung | |
| 5,551,831 A | | 9/1996 | Corbett | |
| 5,556,250 A | | 9/1996 | Fretwell et al. | |
| 5,564,884 A | | 10/1996 | Farsai | |
| 5,575,438 A | | 11/1996 | McGonigle et al. | |
| 5,677,506 A | | 10/1997 | Wallin | |
| 5,758,785 A | | 6/1998 | Spinosa et al. | |
| 5,816,552 A | * | 10/1998 | Chapman | 248/281.11 |
| 5,907,111 A | * | 5/1999 | Josten et al. | 73/866.5 |
| 5,949,015 A | | 9/1999 | Smith et al. | |
| 6,009,791 A | | 1/2000 | Medlin | |
| 6,098,823 A | | 8/2000 | Yahiaoui | |
| 6,113,343 A | | 9/2000 | Goldenberg et al. | |
| 6,158,555 A | | 12/2000 | Brown, Jr. | |
| 6,174,124 B1 | | 1/2001 | Haverfield et al. | |
| 6,260,310 B1 | | 7/2001 | Price et al. | |
| 6,302,010 B1 | | 10/2001 | Holler | |

FOREIGN PATENT DOCUMENTS

WO          96/09490          *    3/1996

* cited by examiner

Primary Examiner—Steven A. Bratlie
(74) Attorney, Agent, or Firm—Lewis, Rice & Fingersh, L.C.

(57) ABSTRACT

Disclosed herein is an elevating lift for raising and lowering a load (such as a sensor suite) onboard a vehicle, such as a Humvee, which can allow for the transport of the vehicle in a standard transport without removal of the sensor suite from the vehicle, and can provide for a more stable support for the load than is available from a traditional mast. The elevating lift may also able to maintain the load in a parallel position as it is raised, and may be able to lock in a intermediate position where the sensor suite can be used while the vehicle is in motion.

14 Claims, 8 Drawing Sheets

ELEVATING LIFT

BACKGROUND OF THE INVENTION

1. Field of the Invention

This disclosure relates to the field of elevating lift apparatus. In particular, to elevating lift apparatus mounted on vehicles for the lifting of loads such as sensor suites.

2. Description of the Related Art

In military strategy, there is a great desire to be able to view the enemy and bring firepower to bear on enemy soldiers, while still keeping your soldiers out of harm's way. One method which is used to bring such firepower upon an enemy from a distance is the artillery barrage. Artillery weapons are generally designed to be able to deliver ordnance onto a target from a great distance and thus are capable of firing indirectly at targets which they cannot see because of intervening terrain by firing their ordnance in high arcs. As will be understood by those of skill in the art, artillery batteries are often safe from enemy fire, as the enemy generally cannot locate them to direct retaliatory fire, and even if the enemy might determine their location, the enemy may not have access to weapons with sufficient range to deliver its ordnance onto the artillery battery.

The problem with firing artillery, however, is that the ordnance fired must be aimed so that it is accurately delivered onto enemy positions, instead of just being fired randomly, or worse upon friendly positions which may be nearby. Since the artillery batteries are out of sight of the enemy, it is not possible for the artillery gunners to sight their weapons directly. Artillery has traditionally relied on forward observers to identify targets, provide the enemy positions, and track where the ordnance is hitting and adjust the fire appropriately.

In many instances, forward observers have been infantry and armor soldiers, or field artillery soldiers, that had worked their way to positions within sight of the enemy whether ahead of the front lines or at the front lines. They then instructed (by radio or some other remote communications method) the fire control center, of artillery units, on adjustment of fire by methods familiar to those of ordinary skill in the art in order to hit targets. As visual enhancement technologies have gotten more sophisticated, the individual has had an increased range and ability to see targets. These technologies have included a simple pair of binoculars, advanced night vision and RADAR systems, and other sensing apparatus. As the technology has developed, so generally has its bulk and weight. It is also desirable to put the forward observers in a vehicle to better protect him/her from the enemy's likely retaliation of the barrage. Therefore, in much of artillery forward observing activity, a vehicle carrying a sensor suite of various different types of sighting apparatus is regularly used for forward sighting with a crew of a few individuals locating targets and returning those locations to the batteries.

As will be understood, the vehicle used is much larger than a soldier performing such duties. Thus, the vehicle needs to use various specialized tactics to avoid detection and retaliatory fire. One of these tactics is to position the vehicle behind some type of concealment and then raise the sensor suite above the cover. In this instance, the sensor suite could be damaged by retaliatory fire, but the vehicle (and its human occupants) may be protected by the vehicle's armor and the cover behind which they are concealed. A still further tactic is to position the vehicle in defilade, which is placing the vehicle on one side of a hill (using the bulk of the hill to protect the vehicle) and raising the sensor suite above the vehicle in a manner so that the sensor suite can see over the hill and down the other side. Defilade relies on the use of mathematical relationships and available angles to provide the sensor suite with a clear field of view. In particular, the sensor suite needs to have a clear sight line downward in front of the vehicle to observe down the far side of the hill, without the vehicle's body blocking that view and with the vehicle still hidden by the hill from the enemy in front of it.

Further, because of the sensitivity of the sensor suite and the accuracy required to effectively assist artillery batteries in bringing ordnance onto desired targets, the mount for the sensor suite on the vehicle needs to be designed to reduce vibration and unintended motion of the suite to increase the accuracy of the targeting. This is particularly true when the suite is being operated at an extreme range from desired targets. Anticipated motion and motion of relatively small magnitudes is generally compensated for through the use of an isolating or gimble mount for the sensor suite. While the isolating mount is successful at dealing with motion whose direction and intensity is known, it cannot always compensate for motion which is unexpected or of particularly large magnitude or which occurs in a manner that bypasses the isolating mount's systems. It is also easier to compensate for motion in certain directions (such as linear motion) with an isolating mount whereas other types of motion (such as rotational) are more difficult to deal with. For this reason, it is therefore desirable to minimize any unintended motion and to dampen any potentially large motions. This is generally accomplished by keeping the sensor suite as stable as possible by providing the sensor suite an attachment to the vehicle which is as stable as possible and/or trying to eliminate motion of the vehicle which could be unintentionally transmitted to the suite.

In order to employ effective artillery tactics, it is necessary to mount the sensor suite at a high point on the vehicle so that it can have the field of view necessary for use in defilade positions or, ideally, to mount the sensor suite on a boom or platform which can be raised above the vehicle for this use. Such mountings keep the vehicle used by a forward observer from narrowing the sensor suite's field of view and allow the vehicle to be positioned out of sight. Previously, there were two methods of mounting the sensor suite to the vehicle. In one method, which was generally used for lighter vehicles, the sensor suite was mounted to the roof of the vehicle which was carrying it. This provided for a fairly rigid, stable platform for the device but also created certain problems. For one, the sensor suite would often take up the position of the defensive weapon mounted on the vehicle, leaving the occupants of the vehicle more vulnerable to attack. Further, the height of the suite was limited to that of the vehicle to which it was attached and thus could lead to parts of the vehicles body being vulnerable when the suite was in use. The vehicle may also have blocked a portion of the sensor suite's view if the vehicle was to be in a good defilade position.

Still further problems resulted from the vulnerability of the sensor suite when mounted on the roof. The suite could be hit by branches or other objects which could damage the sensor suite as the vehicle traveled to its forward observer location. The sensor suite is, by design, to be above the protective body of the vehicle. A more specialized problem, but also a significant one, is that the vehicle with the sensor suite mounted on its roof generally does not fit into standardized transports. This is particularly problematic in air transport scenarios. The C-130 aircraft, which is regularly used by the United States to transport vehicles to battle zones, is designed for extremely efficient storage of vehicles. Military vehicles are built to fairly standardized sizes (essentially blocks) allowing large numbers of them to be placed in close proximity to each other, within the storage areas in a C-130. For this reason, items attached to the exterior surfaces of the vehicles are often removed to allow the vehicles to be more closely packed. This can include defensive weaponry and the sensor suite discussed above. The difficulty with this situation is that the sensor suite is an instrument which must be "bore sighted" before it is accurate. Whenever it is removed and replaced it must be re-sighted due to possible inconsistencies with its new placement upon its repositioning on the vehicle. This is a time-consuming and undesirable outcome under combat conditions, so it is preferred that the sensor suite be mounted on the vehicle in a manner such that the vehicle can be packed for transport, without having to remove the sensor suite. It is particularly valuable if the vehicle can be packed for C-130 air transport.

In order to avoid some of the problems with the rigid roof mounting of the sensor suite, extensible booms have been used to attach the sensor suite to the vehicle. These are generally of the form of a single tube or cylinder which extend straight upward from vehicle carrying the sensor suite on a platform at the top. This type of structure is referred to as a mast, and allows for very efficient raising of the senor suite above the roof of the vehicle eliminating many of the problems of the roof mount. It also allows for a large amount of height to be gained without the need for a lot of machinery or lift mechanism. The use of a mast also helps isolate the sensor suite from the vehicle to help keep the vehicle more out of harm's way when the sensor suite is in use.

While a variety of lifts may be used to raise the sensor suite from the vehicle, the mast is particularly desirable because it provides two additional features not present in most other types of lifts. In particular, the platform at the pinnacle of the mast is always kept parallel as the mast raises vertically, meaning that the sensor suite can be operated with the mast at any elevation. The mast is also simple, inexpensive, and collapses into a small space. The mast itself, however, still has many problems because it is not a particularly stable structure, especially when extended to maximum height.

In the first instance, the extended mast is very top heavy. Because it is a single (generally hollow) cylinder, the mast is generally quite light weight, while the sensor suite, which is at the top of the mast, is relatively heavy. This means that when the mast is extended, the center of gravity of the vehicle moves up the mast. This can result in multiple problems. If the vehicle is light, or has extensive suspension, the vehicle may rock or sway when the mast is extended as the mass of the vehicle is insufficient to compensate for the remote mass of the sensor suite. This may lead to problems with the delicate sensors being unable to be used at their maximum ranges. This is why masts generally have only been used on heavier vehicles as the vehicles provide more support and help keep the center of gravity of the vehicle mast system closer to the ground. However, the use of heavier vehicles is not as desirable as it makes the vehicle dramatically more expensive, can slow the vehicle down making it harder to evade the enemy, and can also make it more easily detected.

Another problem presented by the mast is the vulnerability of the mast itself. As stated above, the mast is generally light and hollow. This provides for a strong resistance to forces imposed longwise on the cylinder (e.g. the sensor suite's mass pushing back toward the earth) but is very vulnerable to forces pushing against the sides of the cylinder as is known to those of ordinary skill in the art. A small amount of force in the plane of the vehicle can result in a large torsional force being asserted by the sensor suite (and/or the vehicle) on the structure of the mast. The mast therefore should not be exposed to significant forces in the plane of the vehicle when the mast is extended. These can include wind or acceleration of the vehicle as these forces may lead to bending of the mast. The latter is particularly problematic because it means that the vehicle needs to remain stationary when the sensor suite is deployed regardless of height, which can make it more vulnerable to observation. Further, when the mast is extended, the vehicle cannot move, even at slow speeds, as any acceleration will be magnified by the mass of the sensor suite and can generate a torsional force on the mast in an undesirable direction leading to damage to the mast and possible collapse and failure of the sensor suite.

SUMMARY

Because of these and other previously unknown problems in the art, it is therefore desirable to have a elevating lift for raising and lowering a load (such as a sensor suite) onboard a vehicle which allows for the transport of such a fitted vehicle in a standard transport without removal of the sensor suite from the vehicle, and which provides for a more stable support for a load than is available from a traditional mast. It is further desired that the load of the elevating lift be maintained in parallel at all positions.

In an embodiment, disclosed herein is a vehicle including an elevating lift comprising: a vehicle, the vehicle having a plane in which it travels; a load table upon which a load to be lifted is placed; a support, attached to the vehicle; at least two arms, each of said arms pivotally attached at a first end to the load table and pivotally attached at an opposing end to the support at a point spaced vertically above where the support is attached to the vehicle; a linear actuator positioned such that when the linear actuator changes length, the arms are forced to rotate at the opposing ends in an arc relative to the support, the arms being parallel to each other as the arms traverse the arc; and a motion translator operatively connected to the load table such that as the arms rotate, the load table also rotates in a manner such that the load table is in a generally parallel plane to the plane of the vehicle at all positions of the arms.

In an embodiment, the arms may be attached on opposing edges of said load table, the motion translator may comprise rods and cranks, the linear actuator may change length through screw motion and/or may be a piston operated using at least one of hydraulics and pneumatics, and/or the load table may be able to be raised higher than the highest point of said vehicle.

In an embodiment, the vehicle may comprise a military vehicle such as, but not limited to, an M1025 small tactical vehicle and/or the load may comprise a sensor suite having a field of view which may be unimpaired by the vehicle when the load table is at a predetermined point.

In yet another embodiment, the vehicle may further include a swing arm which can be moved between an engaged and an unengaged position which in turn may be rigidly attached to the load table.

In yet another embodiment, described herein is a vehicle including an elevating lift comprising: a vehicle having a bed and a cab; a load table upon which a load to be lifted is placed; a support, attached in the bed of the vehicle; at least two arms, each of the arms pivotally attached at a first end to the load table and pivotally attached at an opposing end to the support; a linear actuator positioned such that when the linear actuator changes length, the arms are forced to rotate at the opposing ends in an arc relative to the support, the arms being parallel to each other as the arms traverse the arc; and a motion translator operatively connected to the load table such that as the arms rotate, the load table also rotates in a manner such that the load table is in a generally parallel plane to the plane of the vehicle at all positions of the arms; wherein the load table can be moved from a lowered position wherein the load is generally within the bed of the vehicle, to an intermediate position wherein the load is above the highest point of the cab, and a higher point above the intermediate point.

In a still further embodiment, the vehicle may further include a swing arm which rigidly engages the load table when the load table is in the intermediate position.

DETAILED DESCRIPTION OF PREFERRED EMBODIMENTS(S)

Figure 1:
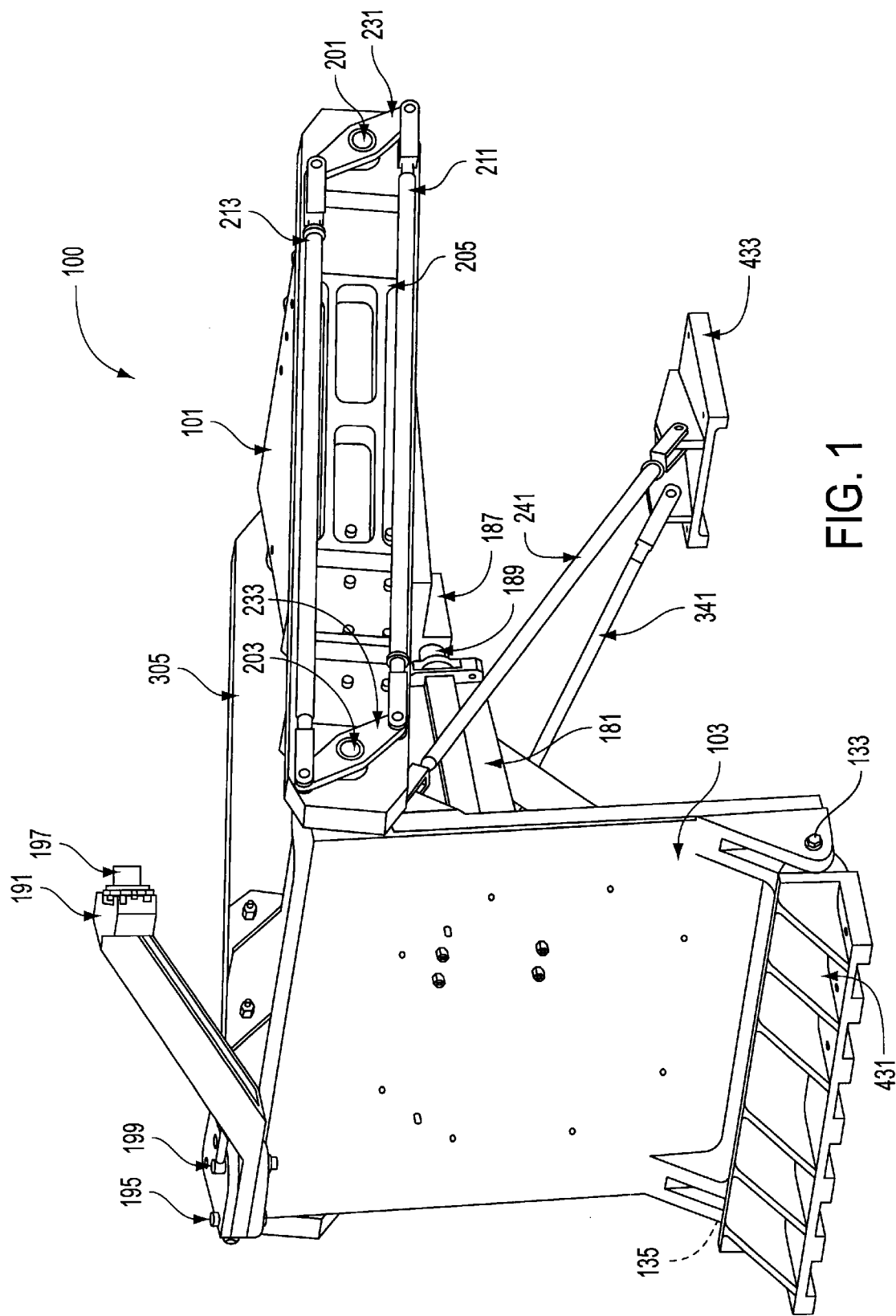
FIG. 1 provides a forward perspective view of an embodiment of an elevating lift when the load table is in its lowered position.

Although the elevating lift discussed below is discussed primarily in terms of its use for lifting a sensor suite, such as that used to sight artillery, it would be recognized by one of ordinary skill in the art that the elevating lift could lift any load attached to the load table whether for a military, commercial, private, or any other use. This could include, but is not limited to, the lifting of sensors or similar devices, the lifting of television cameras, the lifting of communication broadcasting devices such as antennas and/or dishes, the lifting of people, or the lifting of tools or other objects. Further, although the elevating lift is discussed below in use in conjunction with a Humvee (M1025) or similar small tactical vehicle, one of ordinary skill in the art would understand that the elevating lift could be mounted onto any type of military and/or commercial vehicle instead of a Humvee. Alternatively, in other embodiments, the elevating lift could be mounted onto a stationary platform, a vehicle chassis, or a custom built mobile platform for its transport.

Further, in this disclosure, vehicles will often be referred to as including various components. The use of the term "bed" of the vehicle generally refers herein to vehicles designed to carry objects inside the general area of their body, but open to the air on at least one side. Generally this side will be the top, but other sides may also, or alternatively, be open. The bed will also generally be at the rear of the vehicle. For vehicles that have beds, there is also generally a "cab" which is generally enclosed to the outside and is where the driver and/or any passengers usually ride, however the cab can also be opened at the top and/or sides in an embodiment. The roof of the cab (if present) is also generally the highest point of a vehicle. The plane of a vehicle is generally the plane in which the vehicle is traveling, if it were moving, at any instant, and is generally parallel to the bottom surface of the bed. These definitions, however, are in no way intended to limit the plain meaning of any of these terms by one of ordinary skill in the art.

FIGS. 1 through 5 show various different views of an embodiment of an elevating lift (100). The elevating lift (100) generally comprises a load table (101) upon which the load to be lifted by the platform is to be placed. In a preferred embodiment, the elevating lift (100) will be mounted on a military vehicle and the load will be a sensor suite for detecting and/or observing. The sensor suite may include a plurality of different recording and/or observing devices, such as, but not limited to, image enhancing devices (such as, but not limited to, low-light apparatus), Electro-magnetic scanners (such as, but not limited to, infra-red or ultraviolet detecting devices), other scanners (such as, but not limited to, ultrasound or RADAR scanners) and/or vision magnifying or improving apparatus (such as, but not limited to, rangefinders, or optical magnifiers). In an embodiment, the sensor suite (or other load) is not attached directly to the load table (101) but is attached to an isolating mount, such as an isolating gimble mount which is then attached to the load table (101). This isolating mount can be of any type known to the art, but in an embodiment the isolating mount includes motion and vibration isolation and/or damping devices to prevent vibrations and/or motion of the load table (101) from being translated to the sensor suite, and/or to be dampened in their translation to the sensor suite. Some examples of isolating mounts which can be used are described in U.S. patent applications Ser. Nos. 09/844,941 and 09/844,942, the entire disclosures of which are herein incorporated by reference.

Load table (101) is then attached by two pivot pins (201) and (301) to two lift arms (205) and (305) at a first end of each of said lift arms (205) and (305). Generally, the lift arms (205) and (305) will be attached to the outside edge of the load table (101) such that the load table (101) can rotate about said pivot pins (201) and (301). Each lift arm (205) and (305) is then attached at the opposing end to a support (103) through two more pivot pins (203) and (303). The lift arms (205) and (305) can then rotate about pivot pins (203) and (303) to transcribe an arc forming a plurality of angles between the lift arms (205) and (305) and the support (103). It is preferred, that the two arms (205) and (305) be conjoined and move in synchronization with each other, preferably in parallel, such that when the first of the two arms (205) is moved an amount x, in a direction y, to form an angle z with support (103), the second arm (305) also moves the amount x, in the direction y, to form an angle z with support (103).

Generally, elevating lift (100) would be arranged such that the load table (101) will be maintained in parallel with the plane of the vehicle upon which the elevating lift (100) is mounted throughout the movement of lift arms (205) and (305). In the embodiments depicted in FIGS. 1 through 5, this means that the load table (101) and support (103) are generally perpendicular to each other. One of skill in the art would, however, see that such an arrangement is by no means necessary. In the depicted arrangement, the support (103) will generally be attached to the bed of the vehicle using forward mounting bracket (431). Forward mounting bracket (431) is, in the depicted embodiment, a triangular buttress that is used to hold the support (103) in a generally vertical position, perpendicular to the bed of the vehicle. The pivot pins (203) and (303) and the arms (205) and (305) will then generally be attached at a position vertically separated and above the position where forward mounting bracket (431) attaches to the vehicle bed.

The Humvee body is designed for rugged battlefield conditions. To help it survive, the Humvee has a flexible body. It is desirable to align the plane of the load table (101) with the plane of the bed and therefore the plane of the Humvee's travel, but the body of the bed can bend and the rigid forward mounting bracket (431) may not necessarily line up support (103) correctly to make the plane of the load table (101) parallel to the plane of the bed. In order to improve the ability to align the plane of the bed and the plane of the load table (101), an embodiment of the elevating lift (100) includes an aft mounting bracket (433) and two adjustable tension rods (241) and (341) as further support. In addition, the support (103) is rotatably attached to the forward mounting bracket (431) at pivots (133) and (135). The aft mounting bracket (433) is generally mounted to the bed of the Humvee, with the tension rods (241) and (341) attached thereto and to the support (103), generally toward the upper edge portion of the support (103). The tension rods (241) and (341) therefore help to provide moment restraint of the support (103) and forward mounting bracket (431). Since the tension rods (241) and (341) are flexible and can bend, the elevating lift (100) can flex slightly with the body of the Humvee preventing the elevating lift (100) from suffering damage from the flexing of the Humvee and from separating from the bed. Further, the tension rods (241) and (341) can be individually tensioned so as to insure that the load table (101) is parallel to the plane of the bed by providing small adjustments to the positioning of support (103).

The placement of the elevating lift (100) in the bed of a vehicle provides for certain advantages. This placement does not require the sensor suite to be entirely enclosed by the sides of the bed, but to generally be supported over the bed area of the vehicle, as opposed to on the vehicles roof, for instance. This placement places the elevating lift (100) and sensor suite in a traditional cargo area of the vehicle which makes the sensor suite carried in a more standard fashion. This can make the vehicle easier to pack for transport and/or easier to drive as the sensor suite may not effect the performance or size of the vehicle as dramatically as a roof mount.

One of ordinary skill in the art would understand that the use of forward mounting bracket (431) and aft mounting bracket (433) to mount the elevating lift (100) in the bed of a vehicle is merely one of a plethora of ways that the elevating lift (100) can be attached. In another embodiment, the support (103) can be attached either alternatively from, or in addition to, the forward mounting bracket (431) and/or aft mounting bracket (433) by attaching portions of the support (103) directly to, or within, the body of the vehicle (for instance, by attaching the support (103) by one of its planar surfaces to the rear of a cab portion of the vehicle). In yet another embodiment the arms (205) and (305) could be attached directly to the body of the vehicle at pivot points (203) and (303) using a portion of the vehicle's body as support (103).

In operation, the elevating lift (100) is designed to move the load table (101) between a plurality of different positions. These positions are any position within the swing of the arms (205) and (305). However, for practical purposes, when the elevating lift (100) is mounted on a vehicle, the motion of the arms (205) and (305) is limited between a lowest position (where any lower motion is prevented by the existence of the bed of the vehicle and/or the structure of the elevating lift (100) (e.g., aft mounting bracket (433) and or tension rods (241) and (341)) and a highest position (or forward most position) where the load table (101) is at the highest possible position (this occurs when the arms (205) and (305) are vertical). In an embodiment, the highest position is not the extreme forward position as the arms (205) and (305) can swing through the vertical. This position could, for instance, be useful for a particular type of elevating lift where the load table (101) rests on the roof of the cab of the vehicle when the sensor suite is in use. One of ordinary skill in the art would understand how to carry out such a setup from this disclosure. For the purpose of this discussion, although the number of positions available is extremely high as the arms (205) and (305) could be positioned at virtually any angle, the positions can generally be divided into three of interest, the lowered position, the intermediate position, and the higher position. These positions each correspond to a particular use of the sensor suite. One of ordinary skill in the art would understand that the exact placement of components shown in the figures are merely representative of these positions and there are a plurality of different relative placements of the components which could be used for the positions (e.g. the higher position could be any position "higher" than the intermediate position, and the lower position could be any position below the intermediate position and either equal to or higher than the lowest position).

Figure 2:
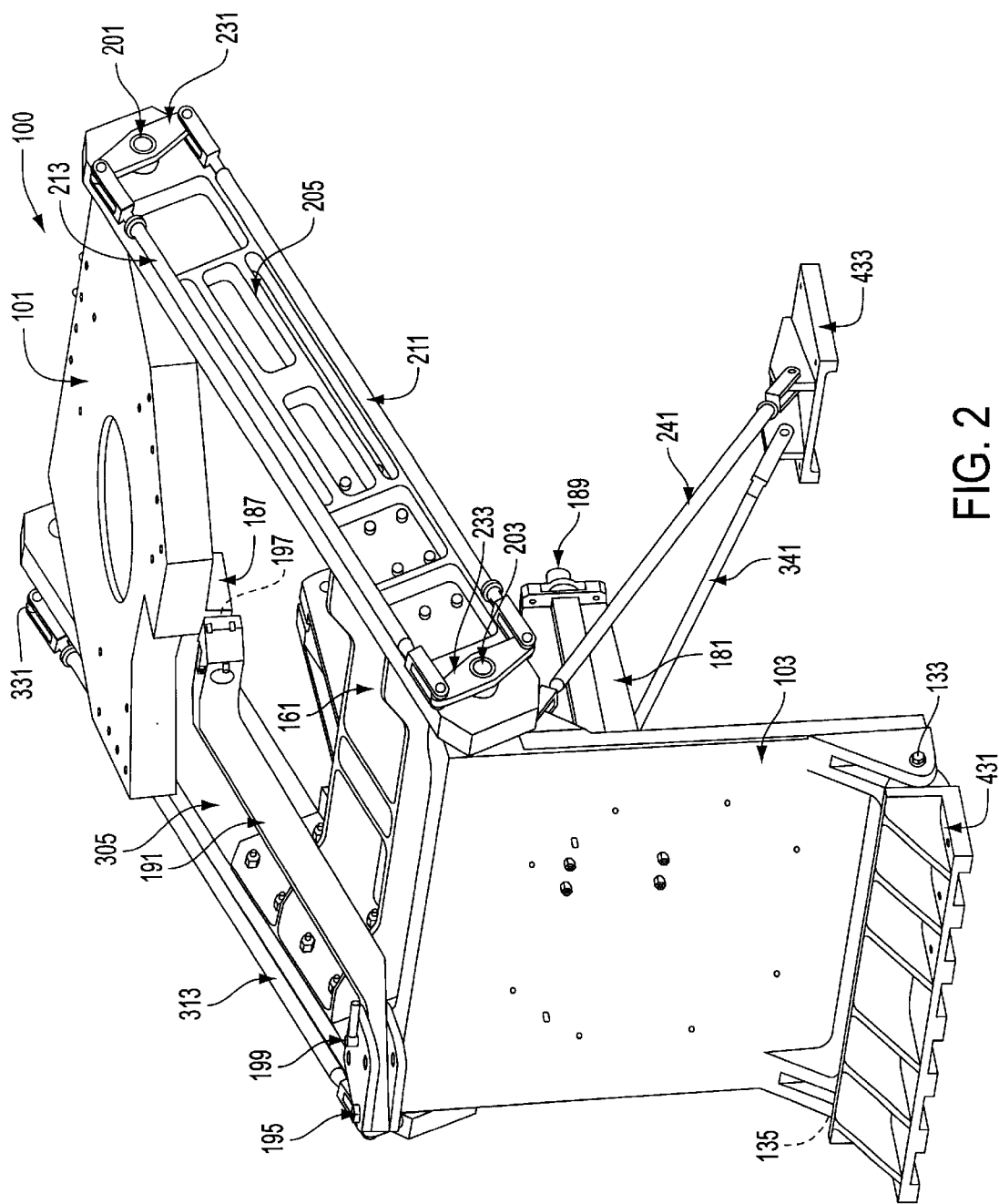
FIG. 2 provides a forward perspective view of an embodiment of an elevating lift when the load table is in its intermediate position.
Figure 3:
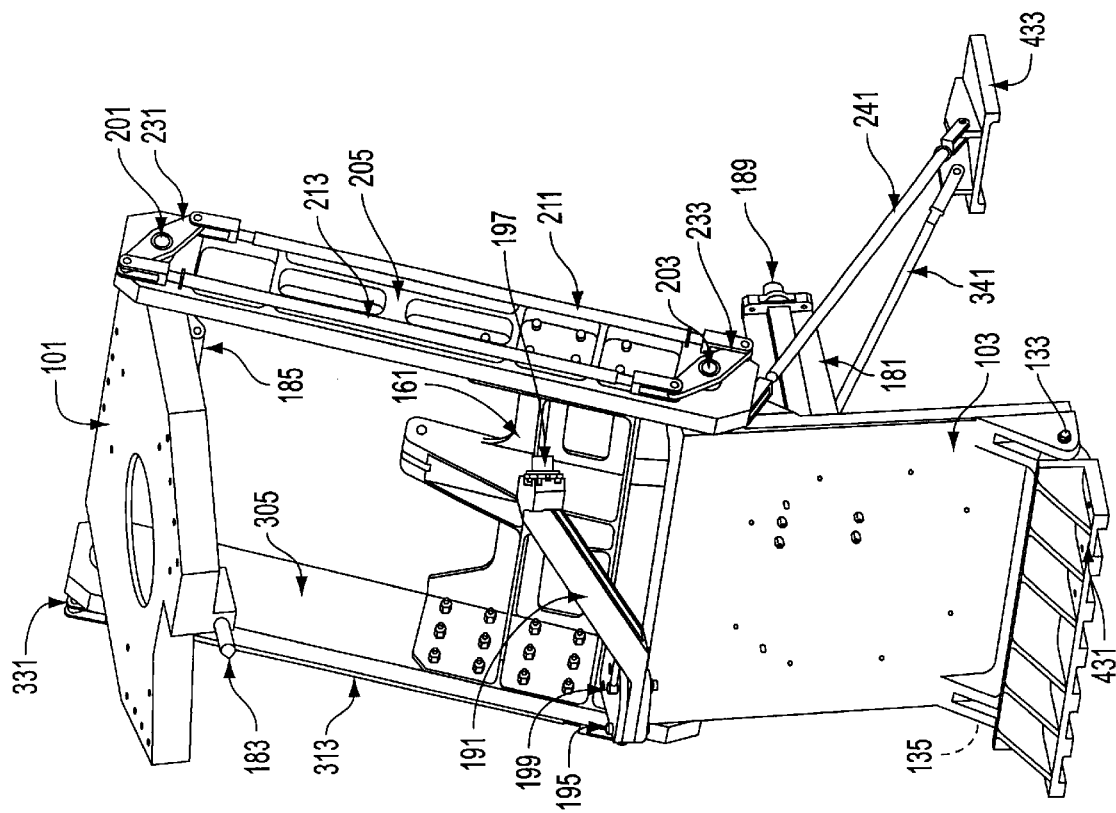
FIG. 3 provides a forward perspective view of an embodiment of an elevating lift when the platform is in its higher position.

In FIG. 1, the elevating lift is shown in the lowered position. In this position the load table (101) and sensor suite combination is generally not significantly taller than the support (103) (shown in FIG. 6). This position would generally be used for transport of the vehicle, and/or for transport of the sensor suite to a designated location. The elevating lift (100) can then be raised to either the intermediate position or higher position as shown in FIGS. 2 and 3 where the load table (101) has been raised to a position where the arms pass through the parallel relative to the plane of the bed. That is, to reach the intermediate position of FIG. 2, the arms (205) and (305) have gone from the lowered position, and passed through the position where they are parallel to the bed of the vehicle, but have not been moved to their higher position yet. FIG. 3 then shows the elevating lift (100) at its higher position where the arms have passed through the intermediate position and generally the arms are at or close to vertical. At this position, the load has been raised to its maximum desired height.

As can be seen by walking through the FIGS. 1 through 3 in order, the elevating lift (100) is raised in a generally parallelogram fashion. That is, the load table (101) is maintained in a position generally parallel to the plane of the vehicle and/or the bed of the vehicle throughout its movement, and/or the support (103) remains generally perpendicular to both the load table (101) and bed while the arms (205) and (305) traverse the possible angles between the lowered and higher positions. This type of lift is preferable because it means that the sensor suite may be used when the load table (101) is positioned at any of the different positions (and the positions between the described positions as well as it is always in a parallel position). This provides for two benefits, firstly, as the plane of the load table and therefore the sensor suite remains constant through the entire movement, any necessary compensation for the sensor suite due to that movement is simpler and in fewer dimensions than if the load table (101) was allowed free movement between points. Further, the sensor suite can be used at any of the other positions between the lower and higher positions if it is opportune to do so without having to recalibrate the sensors as the sensors are pointed in a known direction and the height can be easily determined.

Figure 4:
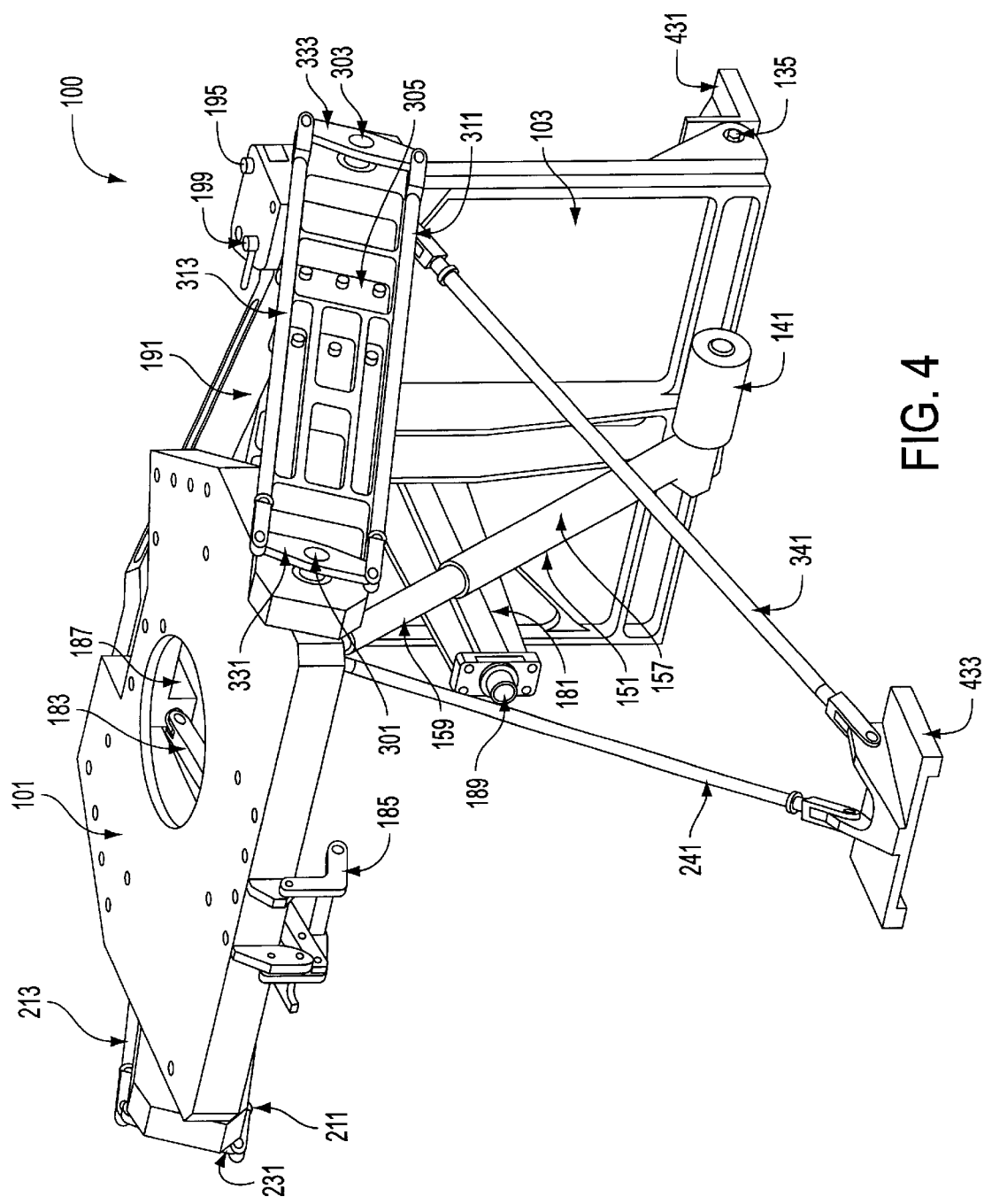
FIG. 4 provides a rearward perspective view of an embodiment of an elevating lift when the load table is in its intermediate position FIG. 5 provides a rearward perspective view from underneath of an embodiment of an elevating lift showing additional detail of the lifting mechanisms.
Figure 5:
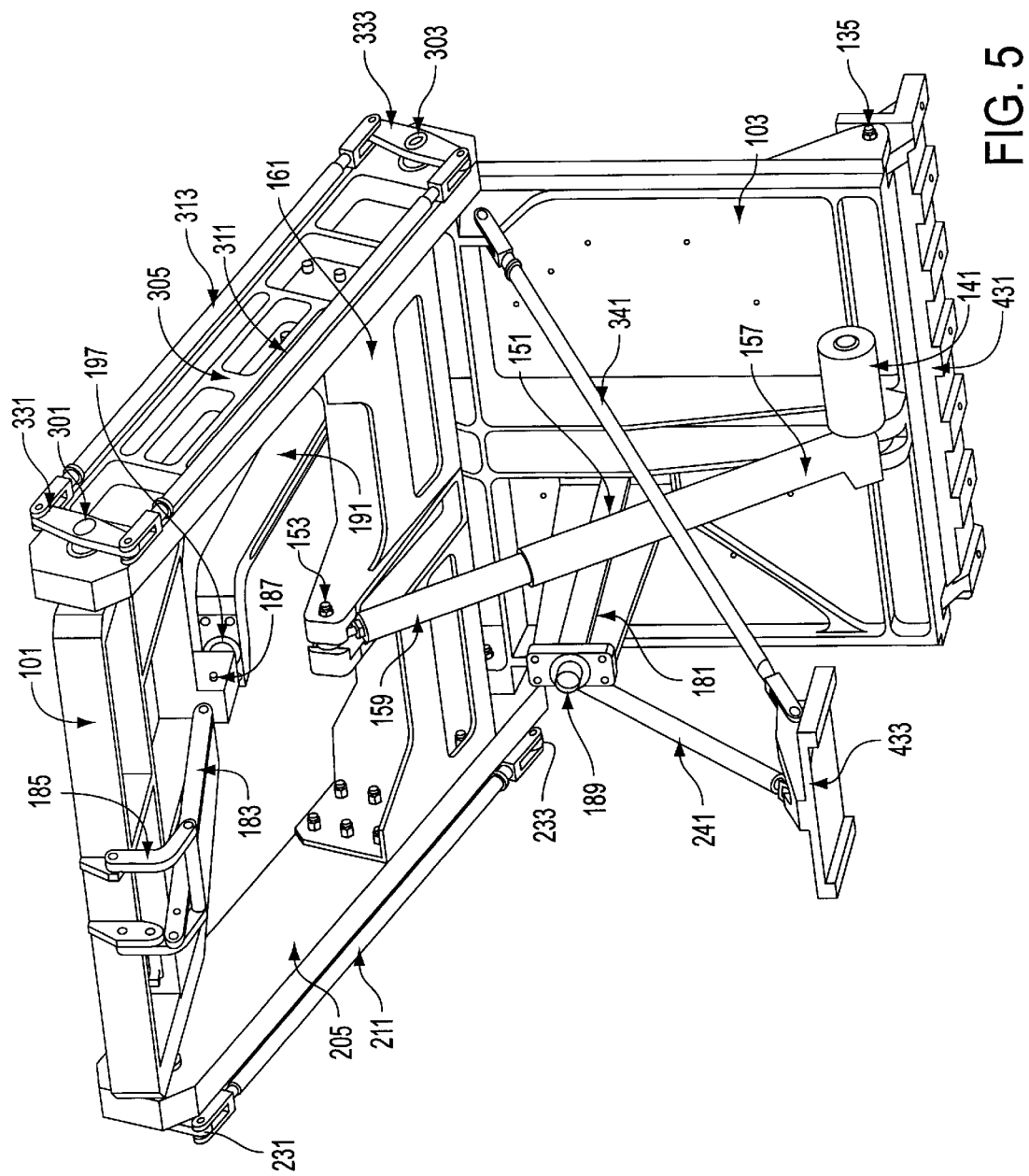

FIGS. 4 and 5 provide additional detail about an embodiment of the mechanisms for moving the elevating lift (100) between the positions shown in FIGS. 1 through 3. In particular, the arms (205) and (305) may be forced to traverse the available angles by the application of a force pushing on the arms (205) and (305) at some point a predetermined distance from pivot pins (203) and (303). In the depicted embodiment, this force is generated by drive mechanism (141) causing linear actuator (151) to extend or retract. Linear actuator (151) is in turn rotatably and rigidly connected to brace (161) at mount (153). Brace (161) is then in turn rigidly attached to at least a portion of both the arms (205) and (305). As linear actuator (151) changes in length, it pulls or pushes on mount (153). Because of the rigid mounting of the brace (161) on the arms (205) and (305), the motion of the path of the mount (153) is limited to an arc with a radius equal to the distance from the mount (153) to the pivot pins (203) and (303). As the linear actuator (151) changes length, there is therefore an instantaneous component of the force generated by the linear actuator (151) which is tangential to this arc and moves the mount (153) within the prescribed arc. As the arms (205) and (305) are rigidly attached to the brace (161) and therefore mount (153), the arms (205) and (305) also traverse a similar arc. In order to insure that there is always a component of the force from the linear actuator (151) which is tangential to the appropriate arc, the linear actuator (151) is mounted at drive mechanism (141) rotatably, so that the end of the linear actuator (151) can transcribe the same arc as the mount (153).

The drive mechanism (141) may be of any type, but it is designed to provide the necessary power to force linear actuator (151) to change in length. Generally, this change in length will be accomplished by linear actuator (151) having two parts, a lower shaft (157) and an upper shaft (159). In an embodiment, the lower shaft (157) is threaded and designed to internally rotate about its main axis from motion provided by drive mechanism (141). The upper shaft (159) is threaded so as to mate with the lower shaft (157), but is not allowed to rotate. Therefore the drive mechanism (141) will turn the lower shaft (157) which in turn will either force the upper shaft (159) from within the lower shaft (157), or draw the upper shaft (159) into the lower shaft (157). This is screw motion and is well understood by those of ordinary skill in the art.

In other embodiments of the invention, different types of drive mechanisms (141) and/or linear actuators (151) can be used. For instance, the drive mechanism (141) could be a pneumatic, hydraulic or other pressure generating system and the linear actuator (151) can be of any type which could be actuated by such a drive mechanism (141) (such as a pneumatic piston, for example). In still another embodiment, the drive mechanism (141) and linear actuator (151) could be replaced by any other type of device which can generate an extension of length of a generally linear object through any manner known regardless of method. The drive mechanism also would not need to be present on the lift itself, but could be, for instance, a power-take-off from the engine of the vehicle.

As was discussed previously, as linear actuator (151) extends in length, the arms (205) and (305) are forced to rotate about pivot pins (203) and (303) respectively and traverse the available angles. As the arms (205) and (305) move in this fashion. The motion of the arms (205) and (305) causes the load table (101) to lift or descend as pivot pins (201) and (301) traverse an arc (presuming that the support (103) is generally positioned vertically as in the depicted embodiments). The load table (101), however, does not obtain any indication of how to remain parallel from this motion, and is in fact encouraged to rotate around its own pivot pins (201) and (301) because they are generally not located at the load table's (101) center of gravity. In order to maintain the load table (101) in a parallel plane as the arms (205) and (305) move, a motion translator is provided to the load table (101). In the depicted embodiment, the motion translator comprises a plurality of tie rods and bell cranks. Four sets (two pairs) of rods are visible in the FIGS. and are labeled (211) and (213) on the first arm and (311) and (313) on the other arm as are four cranks labeled (231) and (233) on the first arm and (331) and (333) on the other arm. These rods, in conjunction with the associated cranks, can translate the rotation of the pivot pins (203) and (303) so that the same angular motion can be duplicated and reversed at pivot pins (201) and (301). This may be performed through a method such as the use of similarly threaded ends on the rods and similar intermeshed gearing on the pivot pins, or through another method, for instance through instantaneous translation of the motion of linear actuator (151). In the depicted embodiment, the motion translation occurs through the motion of pivot pins (203) and (303) rotating cranks (233) and (333). As the appropriate crank rotates each of the two rods attached to that crank are displaced at their first ends where they are attached to the crank (233) or (333). Because the rods are rigid, this displacement is identical to the displacement of the rods at their opposing ends where they are attached to the other set of cranks (231) and (331). These cranks (231) and (331) are therefore displaced an identical amount which forces the pivot pins (201) and (301) to rotate an identical amount, in the opposite direction, to pivot pins (203) and (303). This in turn rotates the load table (101) in exactly the same amount relative to the arms (205) and (305) that the arms (205) and (305) rotated relative to the support (103) keeping the plane of the load table (101) the same and generally parallel to the bed of the vehicle.

In operation, the relative angle between the support (103), the load table (101), and/or the bed of the vehicle remains constant throughout the movement through the action of the motion translator. In this manner, the load table (101) may be raised and lowered through a plurality of different positions while the load table (101) is maintained in parallel relation to the surface upon which the elevating lift (100) is mounted (the bed of the vehicle), so long as it began in that position. This also maintains the load table parallel to the plane of the vehicle. The use of four rods in the depicted embodiment of the motion translator is redundant and only two may be used in another embodiment. In still another embodiment, three or more rods may be used. One of ordinary skill in the art would understand that there are many other ways to maintain the relation of one piece of a mechanism with another while movement occurs and the above only provides one example of a motion translator which may be used in the instant invention.

A further function of the motion translator is to hold the position of the load table (101) relative to the support (103) and vehicle bed. As can be seen from the above description, the load table is not allowed to freely rotate around pivot pins (201) and (301). Because the pivot pins (201) and (301) are locked into the position dictated by the cranks (231) and (331) which are in turn dictated by the position of cranks (233) and (333) and the position of the arms (205) and (305), the load table is always locked into a position by the motion translator based on the location of the arms (205) and (305). Therefore the load table (101) may not freely swing or displace on its own under the force of gravity, as any such motion is resisted by the motion translator.

Figure 6:
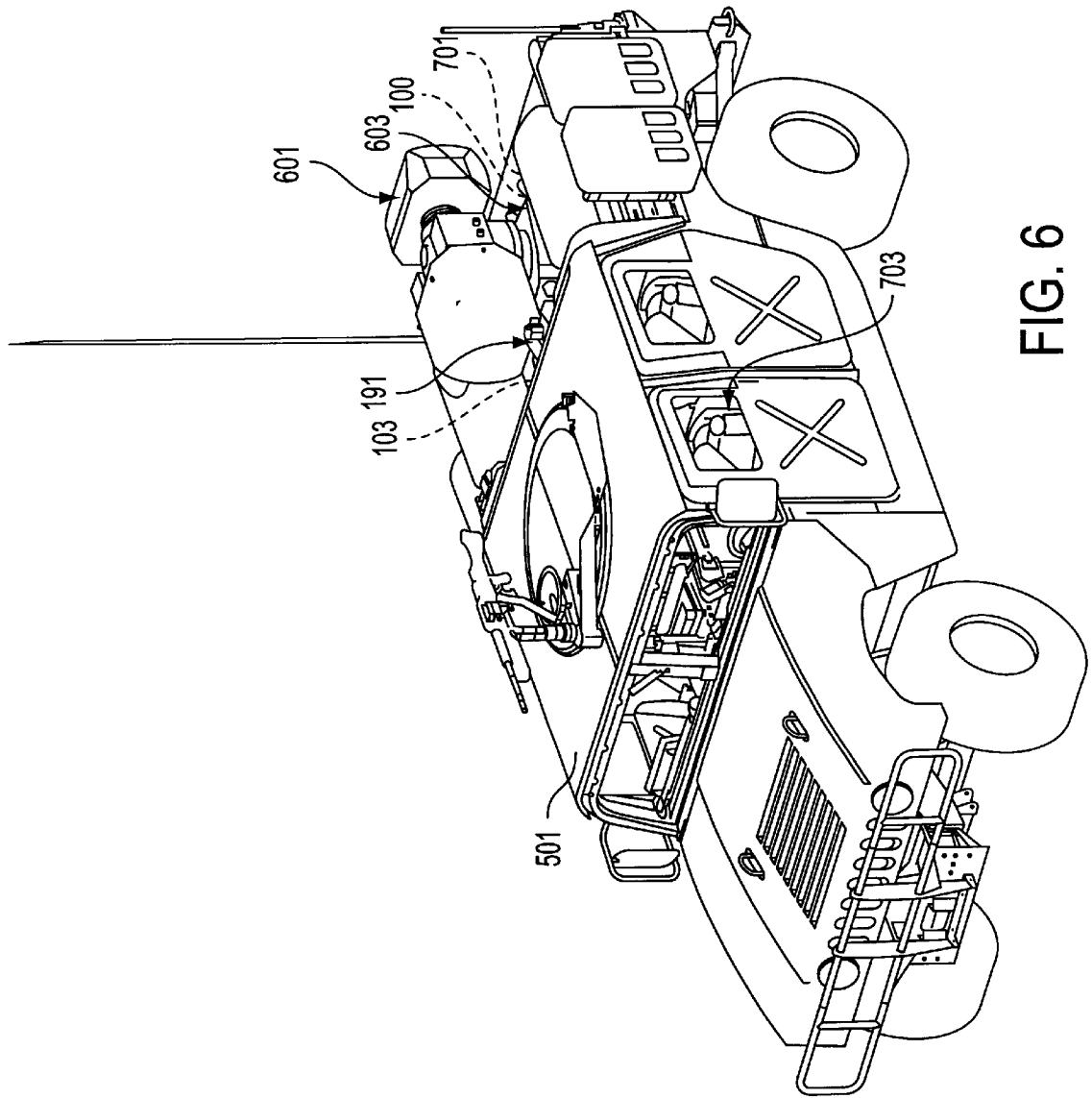
FIG. 6 provides a perspective view of an embodiment of a vehicle incorporating an elevating lift when the load table is in its lowered position with the load stowed.
Figure 7:
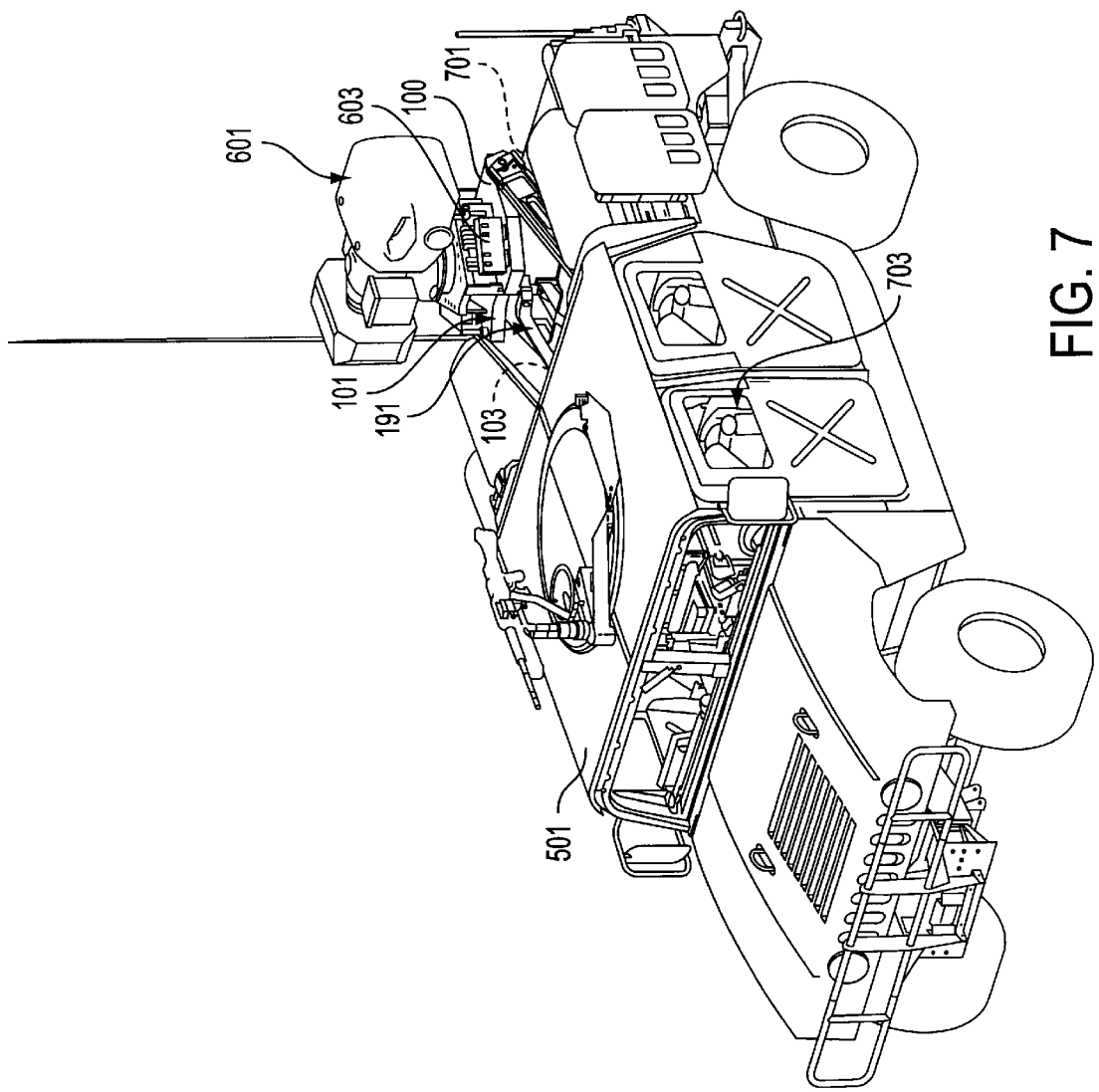
FIG. 7 provides a perspective view of an embodiment of a vehicle incorporating an elevating lift when the load table is in its intermediate position with the load in a position for operation during travel.
Figure 8:
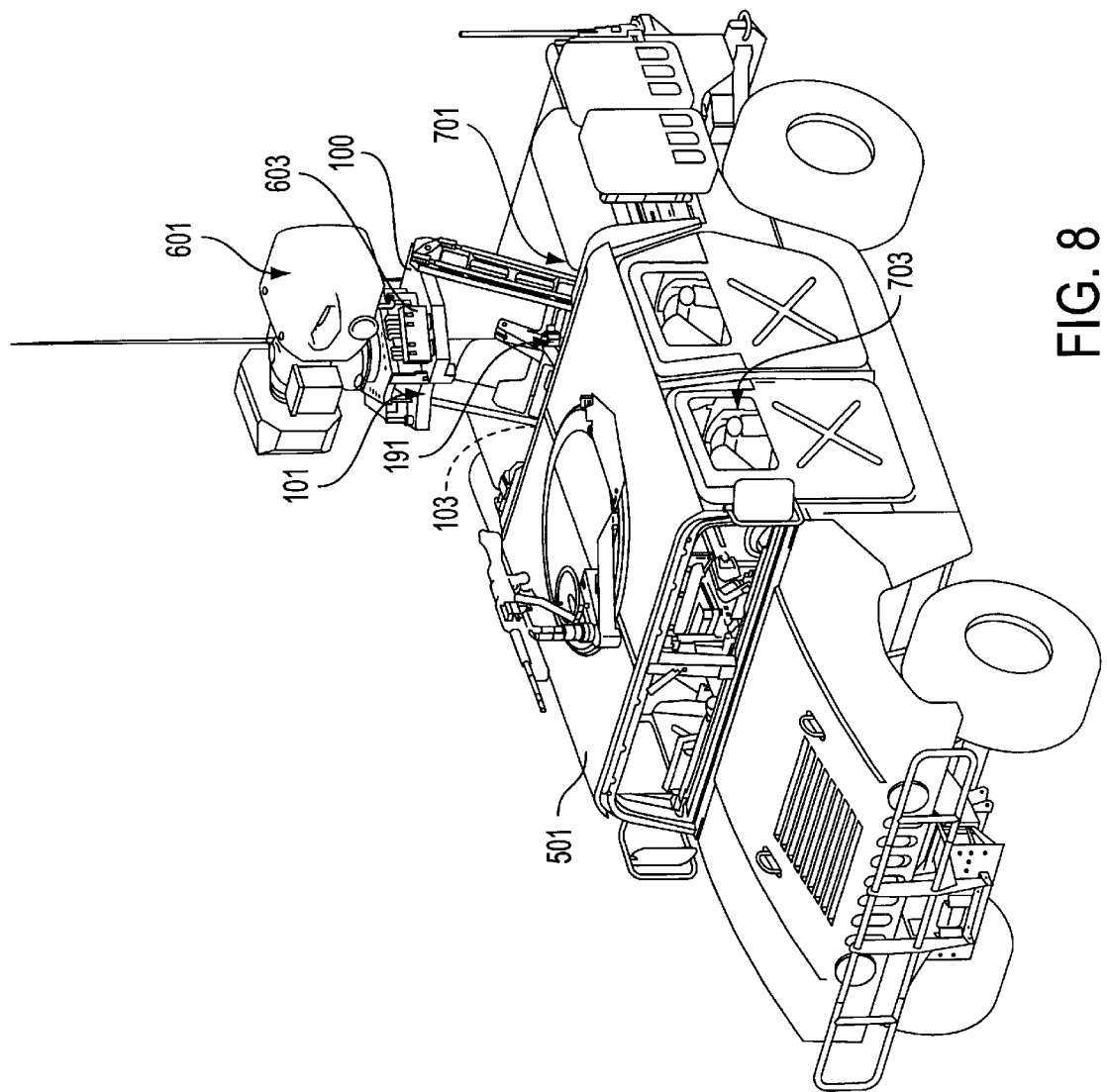
FIG. 8 provides a perspective view of an embodiment of a vehicle incorporating an elevating lift when the load table is in its higher position with the load in a position for operation with the vehicle stationary.

As shown in FIGS. 1 through 3, the load table (101) has three positions of lift which are of particular interest. These are designed for different types of use of the load table (101) and the associated sensor suite in artillery spotting. These types of use and the operation at different points is most easily explained when the elevating lift (100) is described in conjunction with a vehicle. FIGS. 6 through 8 therefore show a Humvee (501) with the elevating lift (100) attached to the bed portion (701) thereof to illustrate how the multiple positions of the elevating lift (100) are used in the artillery spotting example.

In FIG. 6 the elevating lift (100) is in the position of FIG. 1 which is the lowered position. In this position (as shown in FIG. 6) the sensor suite (601) has been lowered into the bed portion (701) of the Humvee (501) for transportation and/or stowage. The sensor suite (601) will generally be unusable in this configuration as the sight of the sensor suite (601) will be blocked by the cab (703) of the Humvee (501). Generally, in this configuration, the load table (101) will be locked in place to a connector (181) mounted on the support (103) to make the sensor suite (101) more rigidly attached to the vehicle. In the depicted embodiment of FIGS. 1 through 5, this is accomplished through the use of a locking bar (183) and handle (185) which are most visible in FIGS. 4 and 5. Movement of the handle (185) results in the retraction or extension of a portion of locking bar (183) beyond the forward side (the side toward the front of the vehicle) of the load table (101) (this may be through a portal (187) as shown in the FIGS.).

To place the elevating lift (100) in the lowered position, the locking bar (183) is retracted under the load table (101) (into the portal (187)) and the load table (101) is lowered to the position of FIG. 1 using the drive mechanism (141) and/or linear actuator (151). When in the appropriate position, the handle (185) can be moved, extending the locking bar (183) forward of the load table (101) and/or portal (187) and engaging a corresponding slot (189) on connector (181). The interconnection of the locking bar (183) and slot (189) provides a third point of attachment for the load table (101) to the support (103) (the first two being the two pivot pins (201) and (301) in conjunction with the arms (205) and (305)). The use of a handle (185) in the depicted embodiment is merely one of a plethora of methods which may be used to move the locking bar (183) between the two different positions (where it is under the load table (101) (within the portal (187)) and where it is forward of the load table (101) (extended from the portal (187)). In alternative embodiments, the handle could be replaced by a second drive mechanism which could mechanically, electro- magnetically, pneumatically, hydraulically, or in any other manner move the locking bar (183) between the two positions. Such systems are well understood by those of skill in the art, and one of ordinary skill in the art would immediately see how the handle (185) could be replaced by such a system. In a still further embodiment, the locking bar (183) can also be replaced by an alternative locking system such as, but not limited to, a clamp, a disk, or a plane.

The locking of the load table (101) to the support (103) helps stabilize the position of the load table (101) and helps insure that the elevating lift (100) moves as a unit and individual pieces cannot move relative to one another. This helps to prevent the torsional movement problem of the mast, and also helps to prevent any damage to the elevating lift (100) from the mass of the sensor suite (601) shifting unexpectedly, or the vehicle having to engage in high speed or jerky movements. In addition, since the load table (101) is lowered into the bed (701) of the Humvee (501), the sensor suite (601) is lowered so that the top of the senor suite (601) is near the same height as the roof of the cab (703) of the Humvee (501) and generally will not extend significantly beyond the planes formed by the exterior surfaces of the Humvee (501). The means that a Humvee (501) incorporating a sensor suite (601) can be carried on board a transporter built to accommodate the Humvee (501) without the sensor suite (601) having to be removed. This is particularly useful for C-130 air transport of the Humvee (501), as the lowered position of the elevating lift (100) can be chosen so that the Humvee (501) can fit into the C-130 transport with the sensor suite (601) still attached.

As shown in FIG. 6, the sensor suite (601) has been rotated on the load table (101) when placed in the lowered position. In an embodiment, this rotation is desirable because it provides for the sensor suite (601) to fit into a narrower cross section of the bed allowing for additional space in the bed to be used to transport other materials (such as extra gasoline or the crew's belongings). In other situations, this rotation can also be used to help protect the sensor suite (601). For instance, more vulnerable (or expensive) portions of the sensor suite (601) can be better encased with the rotation (one half of the senor suite is shielded on all sides but the top by either the body of the vehicle or other portions of the sensor suite (601)). Alternatively, the rotation could allow for the positioning of the sensor suite (601) within special armored panels to provide for protection of the sensor suite (601) during travel. The sensor suite (601) could also be rotated to improve the aerodynamics of the resultant vehicle and/or to prevent debris thrown up by the vehicle's wheels from hitting the sensor suite (601).

FIG. 7 shows the same Humvee (501) as that of FIG. 6, but the elevating lift (100) is now in the intermediate position shown in FIG. 2. This position has the load table (101) partially raised with the sensor suite (601) now in the deployed position where it is rotated to face the front of the vehicle and presumably the targeted enemy. This position of the load table (101) allows for the sensor suite (601) to be above the roof of the Humvee (501) and have a clear field of view over the highest portions of the Humvee (501); particularly the roof of the cab (703) of the Humvee (501), while still maintaining sufficient rigidity so that the sensor suite is dampened from motion of the vehicle, even when it is in motion.

As shown in FIGS. 2 and 7 (and also FIGS. 4 and 5). The elevating lift (100) provides an arrangement which allows for the sensor suite (601) to be in a sufficiently raised position for some targeting, while at the same time providing sufficient support to the sensor suite (601) so that it can be used, even if the vehicle is in motion, without damage to the elevating lift (100) or loss of sensor accuracy. As can be seen from FIG. 7, the sensor suite (601) is positioned at a similar height to what it would be if mounted on the roof of the vehicle. As is known to those of skill in the art, this is sufficient height for some types of targeting actions. At the same time, the elevating lift (100) is already at an intermediate extension so the sensor suite (601) is supported by the suspended load table (101). In an embodiment where the load table (101) would be maintained at such a position, there are other features which may be included to improve the rigidity of the load table (101).

Firstly, because there are two arms (one on either side of the load table (101)) the load table (101) is already made more stable than a mast where the sensor suite (601) is supported from below by a single column. Further, because of the parallelogram motion of the elevating lift (100), and the positioning of the load table (101) in an intermediate position with the arms (205) and (305) slightly through horizontal, but not vertical, there are triangles formed between both the arms (205) and (305) and the plane of the bed (701) of the vehicle, and triangles formed between the load table (101) and the arms (205) and (305) providing increased strength and also natural shock absorbency. This natural absorbency comes from the elevating lift (100) and vehicle bed (701) surface having a generally "Z" shape which allows for the dampening of vertical motion. Further, since the arms (205) and (305) are built rigidly, and the load table (101) is suspended between them (as opposed to being mounted on top of a mast) the load table (101) can generally not move significantly in the horizontal plane either. To further improve the strength and stability of load table (101), there is attached a swing arm (191) which is designed for use in this position, as shown in the FIGS. The swing arm (191) is a special third arm which can be stored out of the way in the lowered or higher positions as shown in FIGS. 1 and 3 amongst others, but in the intermediate position can be swung out from the support (103), or other location, to engage the load table (101) and provide a third connection point for the load table (101).

The swing arm (191) engagement is generally carried out in the same manner that the load table (101) is supported when in the lowered position except that the swing arm (191) is used for engagement instead of the connector (181). The swing arm (191) has a slot (197) mounted thereon for engaging the locking bar (183) when it is extended beyond the load table (101) and/or portal (187). To place the elevating lift (100) in the intermediate position, the handle (185) (or other device as discussed above) is moved to retract the locking bar (183), and the elevating lift (100) is moved to the intermediate position through use of the drive mechanism (141) and/or linear actuator (151). The swing arm (191) is then swung out from its resting position to a position corresponding to the position of the extended locking bar (183), and the locking bar (183) is extended into the slot (197). This motion attaches the swing arm (191) rigidly to the load table (101). The swing arm (191) is preferably of a shape and structure that provides for rigid attachment of the load table (101) when the locking bar (183) is engaged. One such structure is shown in the FIGS. One of ordinary skill in the art would understand that this is not the only type of attachment that may be used and the swing arm (191) may be of any shape and could be attached to the load table (101) by any manner known to one of skill in the art.

As would be clear to one of ordinary skill in the art, when the swing arm (191) is engaged and locked, the load table (101) is held firmly at three points (the two pivot pins (201) and (301) which are locked by gear action of drive mechanism (141) and the motion translator, and the attachment of locking bar (183) and associated slot (197)). Because of the parallelogram structure created with the load table (101) and the arms (205) and (305), the load table (101) is quite secure from side to side motion, and forward and backward lateral motion (essentially from motion in its plane). The arms (205) and (305) "Z" positioning also help to dampen any vertical motion of the sensor suite (601). The remaining motion in these lateral directions can generally be compensated for by the isolating mount (603) of the sensor suite (601). The sensor suite (601) is, however, most vulnerable to rotational motion about the pivot pins (201) and (301) (or in fact rotational motion of any direction). This is particularly acute because the load table (101) does not pivot at pivot pins (201) and (301) about its center of gravity in the depicted embodiments as discussed previously (although in another embodiment the load table (101) could be mounted with the pivot pins (201) and (301) at its center of gravity or its center of gravity when the load is attached). The load table (101) is instead constantly being forced downward by the weight of the sensor suite (601) at the forward end because of the placement of pivot pins (201) and (301) toward the rear of the load table (101). While this motion is resisted by the motion translator as discussed above, the placement of the swing arm (191) at or about the forward end of the load table (101), provides an additional brace against the most likely type of rotational motion to be experienced by the sensor suite (601) and provides a counter-support to the placement of the pivot pins (201) and (301).

The embodiment of the swing arm (191) shown in the figures in only one of a plethora of swing arms which could be used. The swing arm (191) is designed to swing around the pivot point (195) in a direction perpendicular to that which force is expected to be applied by the load table (101) so that the swing arm (191) is not moved between the engaged and unengaged positions by the mass of the sensor suite (601). The unengaged position is shown in FIGS. 1 and 3 while the engaged position is shown in FIG. 2. The swing arm (191) also includes a locking mechanism (199) for holding the swing arm in the desired position. In the depicted embodiment, the locking mechanism is a removable pin with a plurality of different attachment points depending on the desired position of the swing arm, but the locking mechanism could also be any type of structure for maintaining the swing arm (191) in the desired position. This can include, but is not limited to, hand powered structures as well as structures which utilize drive mechanism (141), their own drive mechanism, and/or power-take-off from any other drive mechanism present in the vehicle.

The setup of swing arm (191) in this position is also by no means necessary. In yet additional embodiments, the swing arm (191) could be moveably attached by any other method and need not "swing" or could swing from a different point or points. In another embodiment, the swing arm (191) could extend from the support (103) or from another structure on the vehicle and could be placed by bending, linear extension or any other process.

In yet another embodiment, the swing arm (191) may not move at all but be rigidly fastened in place to engage the locking bar (183). In such an embodiment, it would generally be difficult to move the elevating lift (100) to a position either higher or lower than the intermediate position (depending on setup), but is contemplated in an embodiment of the invention that one of those positions may be unnecessary for the intended use of the elevating lift (100). In those embodiments where a moveable swing arm is used, the swing arm may be moved by any method and/or mechanism. In the depicted embodiment, hand movement of the swing arm (191) is contemplated, but in other embodiments the arm may be moved through the use of dedicated motors, power-take-off motors, gearing systems, pneumatic or hydraulic process, electromagnetic process, or any other process or combination of processes.

As has been discussed, the use of this three point attachment at the intermediate position provides for a sturdier and more rigid load table (101) in the intermediate position than that of a mast. It is therefore possible to operate the sensor suite (601) in this configuration, in an embodiment, while the Humvee (501) or other vehicle is in motion. This is a significant improvement as it allows for the operators of the vehicle to be able to provide targeting information to remote artillery even while they are on the move, making the spotting vehicle a much more difficult target for enemy retaliation, while at the same time gaining the benefits of being able to lower the sensor suite (601) into a storage position.

In FIG. 8 the elevating lift (100) is shown at its higher position where the arms (205) and (305) have passed through the intermediate position and are generally at or close to vertical. As would be understood by one of ordinary skill in the art, the load table (101) could be extended no higher vertically than the position when the arms (205) and (305) are at their vertical position. This provides the maximum height and field of view for the sensor suite (601) and will be presumed to be the higher position, although one of skill in the art would recognize that the arms could be stopped before or after vertical to make the higher position, if desired.

The two arm structure of the elevating lift (100) is more rigid than the single cylindrical mast of the prior art. Because arms (205) and (305) are distributed toward either side of the mass of the sensor suite (the edges of load table (101)), the sensor suite (601) is not as prone to sway under its own mass if the vehicle is fairly light because the weight of the system (sensor suite, elevating lift, and vehicle) is better distributed. While, in an embodiment, the elevating lift (100) in this position can support the mass of the sensor suite without damage when the vehicle is in motion, it will generally not be used when the vehicle is in motion in another embodiment of the invention. This is because the two arm structure of the depicted embodiment, while stronger than the mast, may still be insufficiently strong to support the sensor suite (601) rigidly enough in this position to allow for purposeful motion of the vehicle without rotational motion of the load table (101). In still another embodiment, an additional swing arm (not shown) could be provided to provide for a three point structure which could provide for sufficient rigidity at such the higher position. That is, the higher position, could essentially mirror the attachment at the intermediate position so as to make the sensor suite (601) useable at the higher position when the vehicle is in motion. However, such an arm will generally not be necessary for most operations that would be conducted by the vehicle. One of ordinary skill in the art would recognize that the higher position would generally be used when the vehicle is in defilade or otherwise located behind cover. In this position, mobility with the sensor suite (601) is generally unnecessary.

The maximum height above the vehicle that the load table (101) can reach can be based on a variety of factors and is a design choice of the manufacturer, however, in a preferred embodiment, the support (103) height is chosen so as to be similar to the height of vehicle (501) when placed in the bed (as is clear from FIGS. 6 through 8). This prevents the support (103) from being too high to be effectively loaded onboard a transport leading to the forced removal of the elevating lift (100) and therefore sensor suite (601). It is also preferred that the arms (205) and (305) be chosen to be of an appropriate length that when used on a vehicle with a bed (such as the depicted Humvee (501)), the arms (205) and (305) in the lowered position allow for the placing of the sensor suite (601) in a position where the center of mass of the sensor suite (601) is generally supported over the vehicle, as opposed to extending beyond the rear of the vehicle. It is also preferable that the elevating lift (100) be able to elevate to the highest position possible within the above constraints, therefore using the maximum acceptable height for the support (103) and the maximum acceptable length of the arms (205) and (305), and that such position (and preferably some intermediate positions) be able to allow the sensor suite (601) at least a field of view which is not blocked by the vehicle upon which it is mounted when the vehicle is placed in defilade. It is still further preferred that arms (205) and (305) be mounted at the upper portion of support (103) vertically spaced above where the support (103) is attached to the vehicle.

The selection of these dimensions depends on the dimensions of the underlying vehicle, the area of the bed, and the available extra space in transports which will carry the vehicle such as C-130 aircraft. One of ordinary skill in the art would be able to determine the best specifications for any particular situation without undue experimentation. However, one preferred choice for use with the Humvee (501) has a support height of about 28 to 32 inches from the bed of the Humvee and an arm length of about 36 inches center distance to about 42 inches overall.

One of ordinary skill in the art would also recognize that the elevating lift (100) described above with its intermediate position is useful for attachment to other types of vehicles in addition to Humvees (501). In another embodiment, the elevating lift (100) is attached to an armored personnel carrier or other armored vehicle which is much heavier than Humvee (501) in place of a masted system. Many of these vehicles do not have a bed such as the Humvee does. It may therefore be desirable in these vehicles to attach the elevating lift (100) at a different position. In an embodiment, the elevating lift (100) is attached to the roof of the vehicle to replace a mast or roof mount system and provide for improved strength and rigidity of the elevating lift (100) even if the benefit of C-130 transport is not obtained. In another embodiment, the elevating lift (100) could be attached to the side or rear of the vehicle. In particular, the support (103) could be attached in a position generally parallel to the rear of a vehicle. This could allow for the sensor suite (601) to sit in a position behind the vehicle and protected by the bulk of the vehicle when lowered, but to have the mass of the sensor suite generally behind or to the side of the vehicle. If the vehicle is sufficiently heavy, such offset may not effect the stability of the load table (101) and sensor suite (601).

In yet another embodiment, the elevating lift (100) could be used on a non-traditional military vehicle for spotting. For instance the platform could be mounted on a robotic chassis, or could be mounted on a "technical" (such as a non-military vehicle converted to a military use, i.e., a pickup truck retrofitted with weaponry) or any other civilian vehicle to prepare that vehicle for forward observation use.

In still another embodiment, the elevating lift could be used on a vehicle designed to traverse something other than land, for instance on a boat or other watercraft, or on an air and/or space craft.

In still another embodiment, the elevating lift (100) could be used for a completely non-military purpose. For instance, the sensor suite (601) could be replaced by a television camera and the elevating lift (100) could be mounted on the back of a commercial vehicle (such as, but not limited to, a Hummer, pickup truck, sport utility vehicle (SUV), car, boat, airplane, helicopter, or van) to allow for the capture of television shots as the vehicle drives by and/or from an elevated position. In yet another embodiment, the elevating lift (100) could be used to lift people or tools to an elevated position so that work may be performed. For instance, the load table (101) could support personnel to repair elevated wires, or to trim tall trees.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

What is claimed is:

1. A vehicle including an elevating lift comprising:
   a vehicle, said vehicle having a plane in which it travels;
   a load table upon which a load to be lifted is placed;
   a support, attached to said vehicle;
   at least two arms, each of said arms pivotally attached at a first end to said load table and pivotally attached at an opposing end to said support at a point spaced vertically above where said support is attached to said vehicle;
   a linear actuator positioned such that when said linear actuator changes length, said arms are forced to rotate at said opposing ends in an arc relative to said support, said arms being parallel to each other as said arms traverse said arc;
   a motion translator operatively connected to said load table such that as said arms rotate, said load table also rotates in a manner such that said load table is in a generally parallel plane to said plane of said vehicle at all positions of said arms: and
   a swing arm which can be moved between an engaged and an unengaged position;
   wherein said swing arm in said engaged position rigidly attaches said load table to said vehicle.

2. The vehicle of claim 1, wherein said arms are attached on opposing edges of said load table.

3. The vehicle of claim 1 wherein said motion translator comprises rods and cranks.

4. The vehicle of claim 1 wherein said vehicle comprises a military vehicle and said load comprises a sensor suite having a field of view.

5. The vehicle of claim 4 wherein said vehicle comprises an M1025 small tactical vehicle.

6. The vehicle of claim 4 wherein said field of view of said sensor suite is unimpaired by said vehicle when said load table is at a predetermined point.

7. The vehicle of claim 1 wherein said linear actuator changes length through screw motion.

8. The vehicle of claim 1 wherein said linear actuator comprises a piston operated using at least one of hydraulics and pneumatics.

9. The vehicle of claim 1 wherein said load table can be raised higher than the highest point of said vehicle.

10. The vehicle of claim 1 wherein said swing arm is mounted to said support.

11. The vehicle of claim 1 wherein said swing arm rigidly attaches said load table to said support and said support attaches to said vehicle.

12. A vehicle including an elevating lift comprising:
    a vehicle having a bed and a cab;
    a load table upon which a load to be lifted is placed;
    a support, attached in said bed of said vehicle;
    at least two arms, each of said arms pivotally attached at a first end to said load table and pivotally attached at an opposing end to said support;
    a linear actuator positioned such that when said linear actuator changes length, said arms are forced to rotate at said opposing ends in an arc relative to said support, said arms being parallel to each other as said arms traverse said arc;
    a motion translator operatively connected to said load table such that as said arms rotate, said load table also rotates in a manner such that said load table is in a generally parallel plane to said plane of said vehicle at all positions of said arms; and
    a swing arm which rigidly attaches said load table to said vehicle when said load table is in an intermediate position;
    wherein said load table can be moved from a lowered position wherein said load is generally within said bed of said vehicle, to an intermediate position wherein said load is above the highest point of said cab, to a higher point above said intermediate point.

13. The vehicle of claim 12 wherein said swing arm is mounted to said support.

14. The vehicle of claim 13 wherein said swing arm rigidly attaches said load table to said support and said support attaches to said vehicle.

* * * * *